United States Patent [19]

Reppert

[11] Patent Number: 5,445,362

[45] Date of Patent: Aug. 29, 1995

[54] FENCE ASSEMBLY

[76] Inventor: Francis J. Reppert, 18 Elisabeth La., Collegeville, Pa. 19426

[21] Appl. No.: 202,259

[22] Filed: Feb. 25, 1994

[51] Int. Cl.$^6$ .............................................. A01G 1/08
[52] U.S. Cl. ........................................ 256/24; 256/19; 256/DIG. 2; 47/33
[58] Field of Search ...................... 256/24, 26, 27, 19, 256/67, 1, 25, 31, 59, 60, 21, 22, DIG. 2, DIG. 6; 47/33

[56] References Cited

U.S. PATENT DOCUMENTS

| | | | |
|---|---|---|---|
| 2,020,379 | 11/1935 | Ruppel | 256/34 |
| 2,603,456 | 7/1952 | Ruopp | 256/60 |
| 2,746,723 | 5/1956 | Freeman | 47/33 X |
| 2,835,475 | 5/1958 | Enghauser . | |
| 2,997,277 | 8/1961 | Schwartz . | |
| 3,120,376 | 2/1964 | Case . | |
| 3,195,864 | 7/1965 | Case . | |
| 3,636,829 | 1/1972 | Palmer | 404/7 |
| 3,801,072 | 4/1974 | Newberry, Jr. . | |
| 3,902,702 | 9/1975 | Kinnaman . | |
| 3,902,703 | 9/1975 | Bouye . | |
| 3,910,561 | 10/1975 | Fornells . | |
| 3,951,294 | 4/1976 | Wilson | 47/33 X |
| 4,174,096 | 11/1979 | Campbell . | |
| 4,200,260 | 4/1980 | Dailey . | |
| 4,225,120 | 9/1980 | McLaughlin . | |
| 4,747,231 | 5/1988 | LeMay et al. | 47/33 |
| 5,027,551 | 7/1991 | Rodriguez | 47/33 |
| 5,078,367 | 1/1992 | Simpson et al. . | |
| 5,375,369 | 12/1994 | VerHoeve | 47/33 |

FOREIGN PATENT DOCUMENTS

| | | | |
|---|---|---|---|
| 293337 | 11/1988 | European Pat. Off. | 256/19 |
| 9115943 | 10/1991 | WIPO | 47/33 |

Primary Examiner—Randolph A. Reese
Assistant Examiner—Harry C. Kim
Attorney, Agent, or Firm—Richard C. Litman

[57] ABSTRACT

A fence assembly includes modules of two-foot width. The modules are easily assembled in four-module sections to achieve whatever cumulative length of fencing is desired. A module is joined to an adjacent module by insertion of a clip into vertical, T-shaped slots formed in an adjacent module. Sections are anchored in the ground by pipes having downwardly projecting stakes. These pipe and stake assemblies are located concealed within the first and fourth module of each section. Upper and lower horizontal reinforcing members are attached along the sections. Resilient expanding anchors are used to connect the pipes, extensions, and horizontal members, there being alignable bores formed therein which receive these anchors. In one embodiment, intended for use on flat terrain, the lower reinforcing member is extended through and concealed in longitudinal bores extending through each module. Only one horizontal member is external to and visible from the finished fence of the first embodiment, which has as an important object to present an attractive, uncluttered appearance. In another embodiment, directed to installations on inclined terrain, two horizontal, external reinforcing members are provided, since alignment of bores previously employed to contain the concealed lower reinforcing member would be impossible. The angle mandated by inclination is accommodated by pivot of the reinforcing members about the anchors.

8 Claims, 3 Drawing Sheets

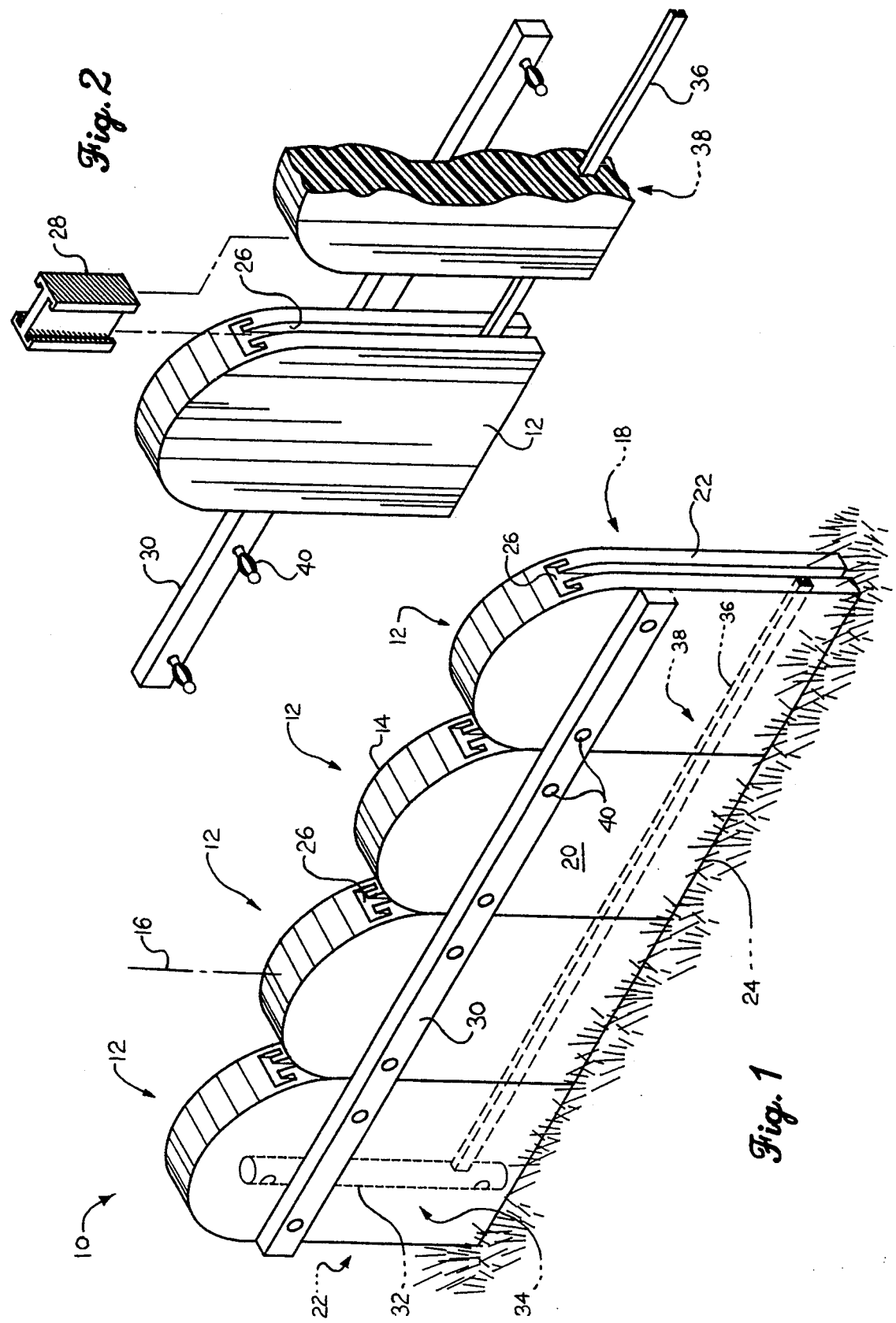

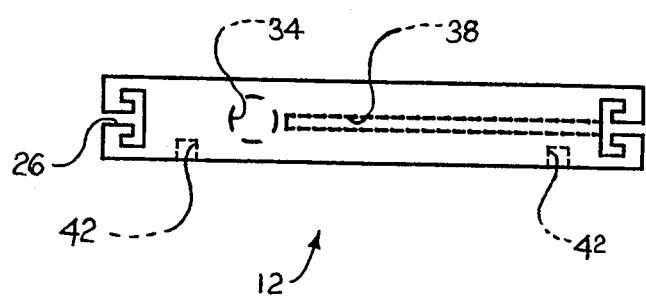
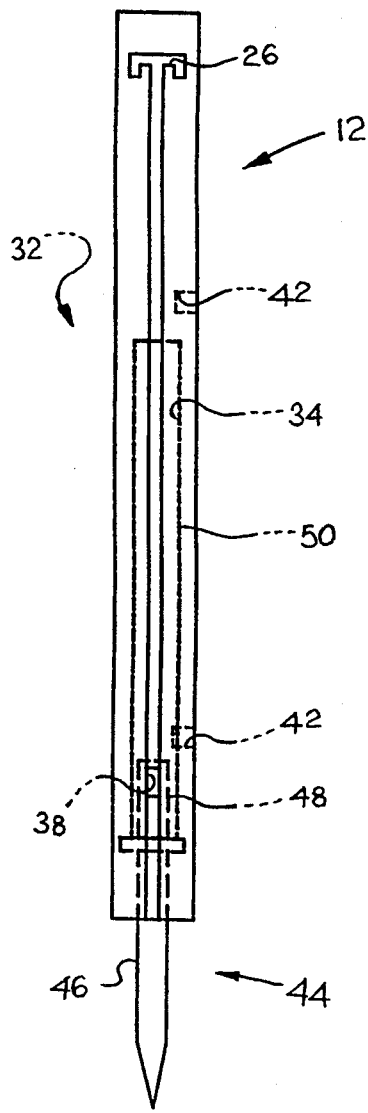
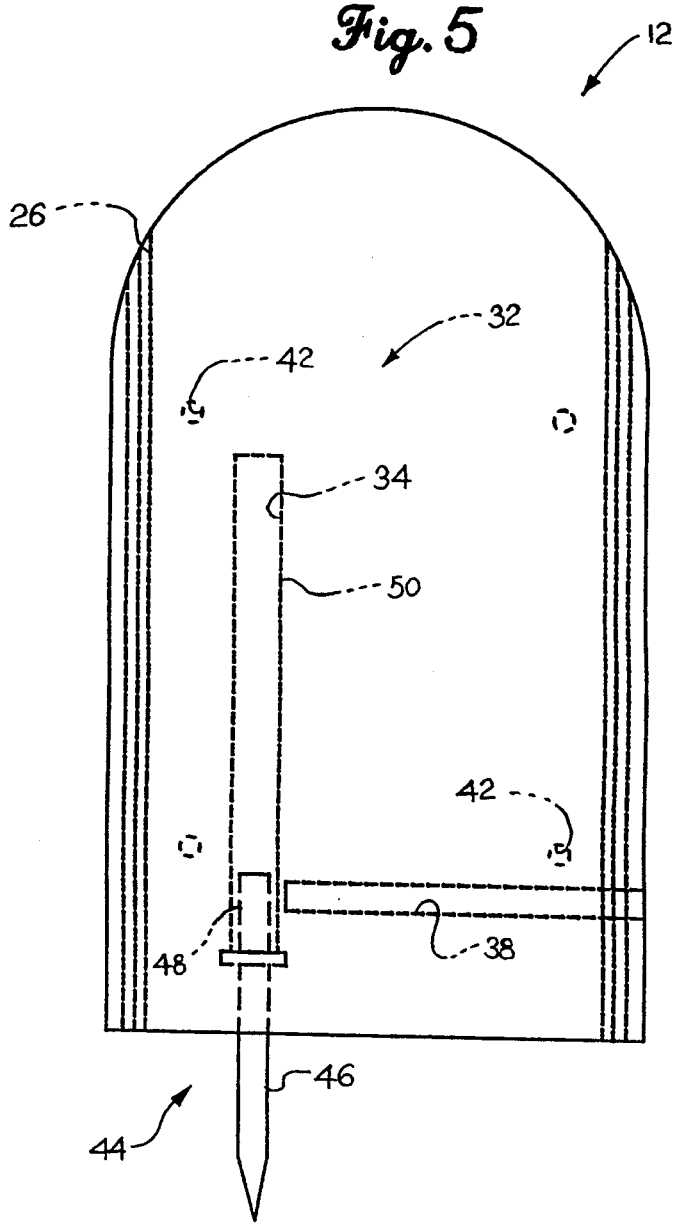

FENCE ASSEMBLY

BACKGROUND OF THE INVENTION

1. Field of the Invention

The present invention relates to an improved fence assembly. More particularly, it relates to an attractive and easily-assembled fence construction that has multiple interlocking panels and horizontal support brackets, is anchored into the ground, and can sit either flush to flat ground or, using pivots, can follow hilly terrain.

2. Description of the Prior Art

People often wish to enhance the privacy and/or security of a location, such as a residence, through the use of fencing. Any of the traditional fences are often difficult for the average consumer to construct, with processes requiring many helpers, various tools, and a significant investment of time. Moreover, many traditional fence designs include large open spaces, which reduce the value of a fence as a protector of privacy. The use of connecting panels can overcome this problem, but such panel arrangements raise additional difficulties involving stability and strength. In addition, with panel arrangements as with many other types of fencing, hilly terrain often presents problems with respect to installation and final appearance. Thus, it is highly desirable to have a fence assembly the erection of which is straightforward, requiring few if any extra helpers, few tools, and little time. It is furthermore desirable to have a fence assembly that provides security by being stable and strong, versatility by accommodating hilly terrain, and privacy by having few or no open spaces. configuration, as is seen in clips employed in the instant invention. However, the fence posts of Case '864 are arranged as sockets to receive fence modules, and not as clamps, which is a feature of the present invention.

Pivoting is also seen in the fence structure disclosed in U.S. Pat. No. 3,910,561, issued to Gilbert P. Fornells on Oct. 7, 1975.

In U.S. Pat. No. 2,835,475, issued to Winford L. Enghauser on May 20, 1958, adaptation of a fence or guard rail structure to a slope is achieved through means of articulated connectors. The structures involved incorporate large open spaces in their design, in contrast to that disclosed in U.S. Pat. No. 3,120,376, issued to John S. Case on Feb. 4, 1964. Case's fence uses boards stacked vertically without gaps to achieve a structure that can be seen through only in the gap between the ground and the lowest vertical board. Pivotal mounting of boards allows slightly sloped terrain to be compensated for.

The multi-section fence taught in U.S. Pat. No. 4,225,120, issued to Robert M. McLaughlin on Sep. 30, 1980, also has provision for sloped terrain. McLaughlin uses large panels which are supported by posts that they are secured to by locking pins. The panels may be horizontally staggered on uneven ground. U.S. Pat. No. 4,200,260, issued to Thomas C. Dailey on Apr. 29, 1980, discloses a picket fence structure to deal with sloped ground. The pickets are connected by keys that fit into key slots cut into the edges of the pickets. The curved keys pivot to allow the picket to fit close to hilly terrain.

A beach shelter whose lower edges sit flush with underlying sand, or are embedded within the sand, is disclosed in U.S. Pat. No. 2,997,277, issued to Frederick Schwartz on Aug. 22, 1961.

None of the above inventions and patents, taken either singly or in combination, is seen to describe the instant invention as claimed.

Numerous patents have issued, related to fences. Some of these patents put emphasis on ease of assembly. For instance, U.S. Pat. No. 3,902,702, issued to Edna K. Kinnaman on Sep. 2, 1975, discloses fence sections that are generally secured together by concealed posts which interfit with recesses on the section end faces. The sections are further secured with locking pins and locking pieces. U.S. Pat. No. 5,078,367, issued to Alan G. Simpson et al on Jan. 7, 1992, shows a panel system designed to be easy to erect. Parts are secured together through the use of various combinations of interlocking members.

U.S. Pat. No. 3,902,703, issued to Jean-Gauthier-Rene Bouye on Sep. 2, 1975, also teaches a fence structure intended to be assembled rapidly. The fence interfits spaced parallel uprights through the use of a snap engagement tenon and mortise arrangement. Another fence that is easy to erect is disclosed in U.S. Pat. No. 4,174,096, issued to David L. Campbell on Nov. 13, 1979. The fence is configured in interchangeable wall sections that are connected together by means of pole and flange arrangements. The flanges involved, in the primary embodiment, are components of horizontal strengthening members. Campbell '096 provides a two part ground engaging member (see FIG. 7), wherein there is an anchored stud, and an upper pipe-like extension. Horizontal reinforcing members are also used in the fence panels disclosed by U.S. Pat. No. 3,801,072, issued to James Henry Newberry, Jr. on Apr. 2, 1974. These horizontal members are disposed externally to the panel, as is typical of built up fences.

The versatility of being pivotable for use on sloped terrain is another characteristic seen in some fence patents. For instance, U.S. Pat. No. 3,195,864, issued to John S. Case on Jul. 20, 1965, teaches a fence with interlocking posts and rails. The rails involved may be pivoted slightly to compensate for sloped ground. The fence posts are arranged to describe a two-headed "T"

SUMMARY OF THE INVENTION

The present invention concerns an improved fence assembly. The fence assembly arranges fence modules in sections that can be easily erected with few or no tools. The modules are of two foot width, and can be combined to form sections of lengths compatible with traditional eight foot sections, but more convenient and easy to handle. The modules can be joined together to form still longer fence assemblies.

Modules are mutually attached by two types of apparatus. Firstly, they are attached along abutting ends by clamps or clips fitting into slots or grooves formed in the modules. These slots have a cross sectional configuration resembling the letter "T".

In addition to connection at abutting ends, upper and lower horizontal rails are provided which attach to the modules they span. In a first embodiment of the invention, that embodiment intended for use on level terrain, the upper horizontal is external to the modules, and snap fits thereto. Snap fit is by expanding, resilient anchors inserted into cooperating bores formed in both rails and modules. A second, lower rail is contained concealed within the modules, occupying aligned bores extending longitudinally through the modules. The second rail is concealed since the bore it occupies opens at the face abutting the adjacent module. Thus, neither bore nor lower rail is visible.

In a second embodiment, intended for use on inclined terrain, upper and lower rails are both of the external, first type. They are generally parallel to the ground, and at an angle which is not perpendicular to the modules. This angle is accommodated by pivot of each rail with respect to each module about the anchor.

The first embodiment provides improved aesthetics over modular fence assemblies because much of the attachment and ground engaging apparatus is concealed. The second embodiment exposes two rails instead of one, but improves on aesthetics by maintaining individual modules upright, while minimizing gaps existing between the lower edge of the module and the ground.

Each section of eight-foot width is anchored into the ground at two points by stakes. Each stake is extended upwardly by a pipe, which occupies a vertical bore in one module. This enables the stake portion, which must survive periodic impacts during driving, to be made from metal or other strong material, while the extension is made from commonly available polyvinylchloride pipe.

Accordingly, it is a principal object of the invention to provide a fence assembly of modular construction.

It is another object of the invention to provide fence modules that may be easily erected, even by an unskilled individual working with but one impact tool.

Yet another object of the invention is to provide an attractive, uncluttered appearance by concealing some components within the fence assembly.

An additional object of the invention is to provide a fence assembly which maintains upright orientation of vertical components, while providing a stepped configuration to conform to inclined terrain.

It is a further object of the invention to provide fence modules that may be secured together by means of clips dimensioned and configured to slide into cooperating openings formed in adjacent modules.

It is also a further object of the invention to provide fence sections which anchor into the ground by impact driven stakes.

Still a further object of the invention is to provide each stake with a friction fitted extension engaging a cooperating bore in its respective module.

Another object of the invention is to provide upper and lower horizontal reinforcing members to enhance the stability of the fence sections.

Still another object of the invention is to provide pivoting connection of adjacent modules, thereby enabling the fence assembly to conform closely to inclined terrain, while minimizing gaps formed below each module and above the inclined terrain.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a diagrammatic, environmental, isometric view of an assembled fence according to the present invention.

FIG. 2 is a diagrammatic, partially exploded, partially fragmentary, isometric detail view of the novel fence assembly, show in individual modules.

FIGS. 3, 4 and 5 are, respectively, a top plan view, an end elevational view and a side elevational view of a module.

Similar reference characters denote corresponding features consistently throughout the attached drawings.

DETAILED DESCRIPTION OF THE PREFERRED EMBODIMENTS

Figure 6:
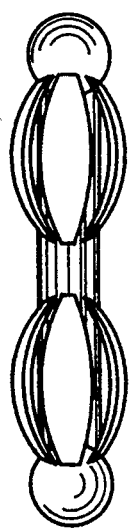
FIG. 6 is a perspective detail view of an expansible anchor employed in the novel fence assembly, drawn to enlarged scale.

The modular fence 10 of the present invention is seen in FIG. 1 to comprise a series of fence modules 12 attached to one another in abutted, operative relationship, collectively providing a fence assembly of predetermined length. Each module 12 has a preferred appearance or configuration preferably simulating a fence of traditional style, built up from individual boards or other elements, an arched panel 14 being illustrated in the example of FIG. 1.

Each module has a vertical longitudinal axis 16, a front side face 18, a rear side face 20, two end faces 22, and a bottom surface 24. End faces 22 include vertical slots 26 open at the top, for insertion of a clamp 28 (see FIG. 2) attaching abutted modules 12 in their operative relationship.

A horizontal rail 30 also connects and reinforces modules 12. As seen in phantom, concealed fence posts 32 are provided within some modules 12, housed within vertical fence post bores 34. Due to standard practice within the U.S. fence industry, modules 12 are preferably two feet in length, and fence posts 32 are located in first and fourth modules 12 of an abutting series of modules 12. This assures that a straight eight foot section is formed, which also conforms to fence industry practice.

To further reinforce modular fence 10, a concealed lower reinforcing rail 36 is provided. This rail 36 is slidably inserted into a second, reinforcing bore 38 extending through each module 40. Bores 38 are horizontal and placed consistently within each module 12 so as to be alignable among an even row of modules 12. Therefore, a reinforcing rail 38 spanning a plurality of modules 12 can unite any desired number thereof.

FIG. 2 illustrates the above relationships in greater detail. As seen in this view, slots 26 describe a "T" shape. This configuration affords substantial grip of slots 26 by clamps 28. Penetration of bore 38 by reinforcing rail 36 is also shown.

Attachment of components is preferably by snap connectors, which encompasses fasteners which are manually set in place and which grip cooperating bores by friction. A preferred snap connector is provided by expansible, resilient anchors 40, which fit into cooperating attachment bores 42 (see FIGS. 3-5).

One embodiment of anchor 40 is illustrated in FIG. 6. As seen in FIGS. 3-5, anchors 40 fit closely into attachment bores 42, cooperating therewith. In like manner, and referring to FIG. 2, clamps 28 slidably engage and cooperate with slots 26. As employed herein, cooperation signifies that there is constant contact between members, and the fit is sufficiently tight to assure friction. The precise relation between diameters and bores is dictated by materials, in that the latter must exceed the former when rigid materials are selected, but the former may exceed the latter in cases wherein elastic or resilient materials are employed.

Anchors 40 attach rails 30 to modules 12, and lock fence posts 32 within modules 12, in detachable fashion. If desired, additional anchors 40 and attachment bores 42 may be provided to secure rails 36 within modules 12.

Construction of modules 12 is better seen with reference to FIGS. 3–5. Recalling from FIG. 1 that some modules 12 must accommodate fence posts 32 periodically provided to anchor modular fence 10 in the ground, it will be seen that interference between a fence post 32 and bore 38 is avoided by configuring rail 36 to have a length less than the combined corresponding dimensions of a section of four modules 12. Of course, although bore 38 is illustrated in FIG. 5 as not intersecting vertical fence post bore 34, these bores 34 and 38 could intersect without rendering the novel arrangement inoperable, provided that rail 38 is appropriately dimensioned and positioned within modules 12.

FIGS. 3 and 4 provide orthogonal views of bores 34 and 38, and slots 26. Attachment bores 42 are also shown. The advantage of the novel configuration is that connection hardware and fence post stakes are substantially concealed, and do not impair the visual effect of the assembled modular fence 10.

The nature of fence posts 32 is clearly shown in FIG. 5. Each fence post 32 has a stake portion 44 including a pointed stake 46 for penetrating the ground, and a stud 48. Stud 48 is configured to be insertable into a fence post shaft portion 50. Thus, stake portion 44 extends well into module 12.

Figure 7:
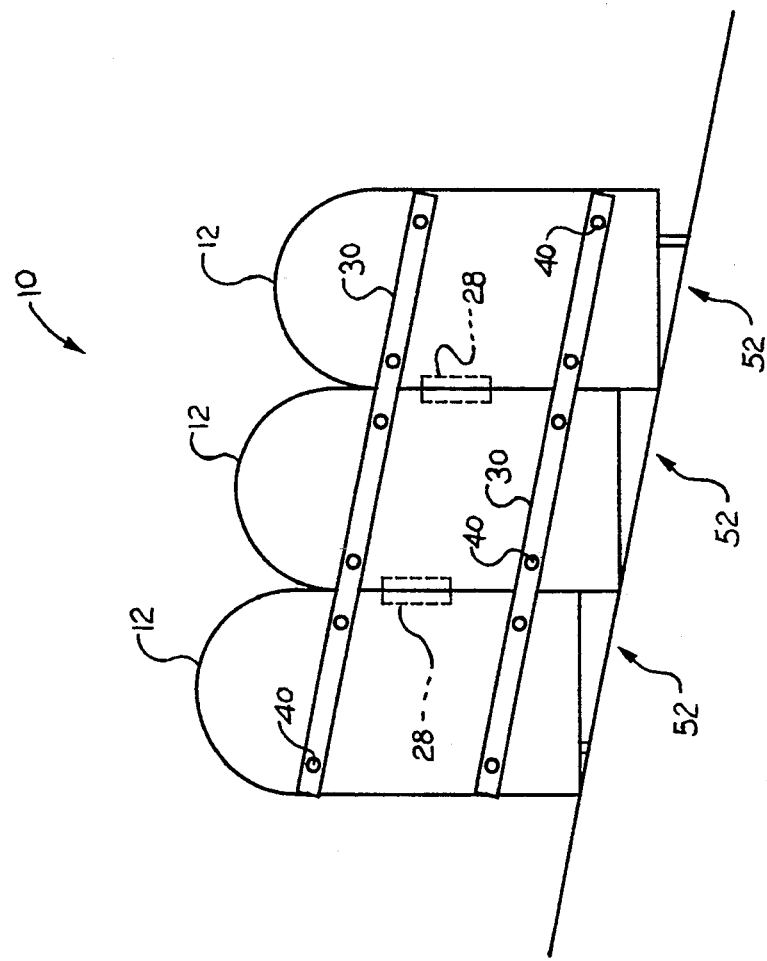
FIG. 7 is a diagrammatic, environmental, side elevational view of a second embodiment of the invention, drawn to reduced scale.

In another embodiment of the invention, shown in FIG. 7, there is a different focus. On inclined terrain, it is desirable to follow the contour of the terrain, but also to maintain modules 12 upright. This is accomplished by erecting modular fence 10 in stepped configuration, while maintaining axes 16 (see FIG. 1) vertical. Although a slight gap 52 exists beneath each module 12, it is not so obtrusive as to be highly objectionable, and the completed fence assembly 10 will be considered satisfactory. As seen in FIG. 7, clamps 28 are still employed to hold adjacent modules 12 in abutment.

Rails 30 pivot about anchors 40, thus accommodating the changing geometry dictated when rails 30 occupy planes other than horizontal. Two rails 30 are provided, since misalignment of bores 38 (see FIG. 1) would render rail 36 (see FIG. 1) inoperative.

Different degrees of inclination of terrain may be accommodated in several ways. One option is to provide a series of attachment bores. In this case, the person erecting modular fence 10 would select an appropriate attachment bore depending upon inclination. Another option would be to require the user to drill attachment bores as needed. The former option increases convenience, and the latter option reduces the chance that an idle bore is visible, thus spoiling the aesthetic effect of the finished fence.

It is to be understood that the present invention is not limited to the embodiments described above, but encompasses any and all embodiments within the scope of the following claims.

I claim:

1. A modular fence assembly comprising:
   a plurality of fence modules each having a longitudinal axis, a front side face, a rear side face, two end faces each having means defining a vertical slot open at the top formed therein, and a bottom surface, at least two of said plurality of fence modules each further having means defining a vertical fence post bore open at said bottom surface;
   a plurality of clamps dimensioned and configured to slide into and cooperate with two said vertical slots formed in abutting said end faces when two of said fence modules are positioned in operative, abutting relationship to one another;
   at least two fence poles comprising a shaft portion corresponding to said vertical bore, and a stake portion having a stud insertable into said shaft portion and a pointed stake;
   at least one first horizontal reinforcing rail spanning at least two said modules and detachably attachable to said fence modules; and
   at least one lower, second horizontal reinforcing rail spanning at least two said fence modules, each of said fence modules including means defining a reinforcing bore alignable with other reinforcing bores, each of said at least one lower, second horizontal reinforcing rail having a cross sectional configuration corresponding to each said reinforcing bore, each of said at least one lower, second horizontal reinforcing rail being removably and slidably insertable into said reinforcing bores.

2. The modular fence assembly according to claim 1, further including a plurality of expansible, manually insertable and removable snap connectors, said fence modules and said at least one first horizontal reinforcing rail having means defining attachment bores corresponding to and receiving said snap connectors.

3. The modular fence assembly according to claim 2, there being upper and lower said first horizontal reinforcing rails spanning at least two said modules and detachably attachable to said fence modules, attachment thereof by said expansible connectors being pivotal, whereby said upper and lower first horizontal reinforcing rails occupy planes other than horizontal to the ground, thus enabling said modular fence assembly to be erected in stepped configuration conforming to inclined terrain, while maintaining said fence module longitudinal axes vertical.

4. The modular fence assembly according to claim 1, said vertical slots being "T" shaped in cross section.

5. A modular fence assembly comprising:
   a plurality of fence modules each having a longitudinal axis, a front side face, a rear side face, two end faces each having means defining a vertical slot open at the top formed therein, and a bottom surface, at least two of said plurality of fence modules each further having means defining a vertical fence post bore open at said bottom surface;
   a plurality of clamps dimensioned and configured to slide into two said vertical slots formed in abutting said end faces when two of said fence modules are positioned in operative, abutting relationship to one another;
   at least two fence poles comprising a shaft portion corresponding to said vertical bore, and a stake portion having a stud insertable into said shaft portion and a pointed stake;
   at least one first horizontal reinforcing rail spanning at least two said modules and detachably attachable to said fence modules;
   at least one lower, second horizontal reinforcing rail spanning at least two said fence modules, each of said fence modules further including means defining a reinforcing bore alignable with other reinforcing bores, each of said at least one lower, second horizontal reinforcing rail having a cross sectional configuration corresponding to each said reinforcing bore, each of said at least one lower, second horizontal reinforcing rail being removably and slidably insertable into said reinforcing bores; and a plurality of expansible, manually insertable and removable snap connectors, said fence modules and said at least one first horizontal reinforcing rail having means defining attachment bores corresponding to and receiving said snap connectors.

6. The modular fence assembly according to claim 5, said vertical slots being "T" shaped in cross section.

7. A modular fence assembly comprising:

a plurality of fence modules each having a longitudinal axis, a front side face, a rear side face, two end faces each having means defining a vertical slot open at the top formed therein, and a bottom surface, at least two of said plurality of fence modules each further having means defining a vertical fence post bore open at said bottom surface;

a plurality of clamps dimensioned and configured to slide into two said vertical slots formed in abutting said end faces when two of said fence modules are positioned in operable relationship to one another;

at least two fence poles comprising a shaft portion corresponding to said vertical bore, and a stake portion having a stud insertable into said shaft porion and a pointed stake;

at least one upper horizontal reinforcing rail spanning at least two said modules and detachably attachable to said fence modules;

a plurality of expansible, manually insertable and removable snap connectors, said fence modules and said at least one upper horizontal reinforcing rail having means defining attachment bores corresponding to and receiving said snap connectors; and at least one lower, second horizontal reinforcing rail spanning at least two said fence modules, each of said fence modules including means defining a reinforcing bore alignable with other reinforcing bores, each of said at least one lower, second horizontal reinforcing rail having a cross sectional configuration corresponding to each said reinforcing bore, each of said at least one lower, second horizontal reinforcing rail being removably and slidably insertable into said reinforcing bores.

8. The modular fence assembly according to claim 7, said vertical slots being "T" shaped in cross section.

* * * * *